United States Patent

Rack

[15] 3,688,743
[45] Sept. 5, 1972

[54] DRY FEED DISPENSERS FOR FISH

[72] Inventor: Josef Rack, 8752 Kahlquelle uber, Aschaffenburg, Germany

[22] Filed: Sept. 16, 1970

[21] Appl. No.: 72,777

[52] U.S. Cl. ..................119/51 R, 119/3, 119/54
[51] Int. Cl. ..............................................A01k 5/02
[58] Field of Search..........119/3, 5, 51 R, 72.5, 53.5, 119/54, 70

[56] References Cited

UNITED STATES PATENTS

| | | | |
|---|---|---|---|
| 1,034,087 | 7/1912 | Detwiler | 119/70 |
| 1,105,885 | 8/1914 | Crowell | 119/70 |
| 3,487,433 | 12/1969 | Fleming | 119/51 |
| 1,168,902 | 1/1916 | Oakes | 119/70 |
| 1,801,787 | 4/1931 | Zehner | 119/70 |
| 2,594,968 | 4/1952 | Miller | 119/72.5 |
| 3,418,977 | 12/1968 | Godshalk | 119/72.5 |

*Primary Examiner*—Aldrich F. Medbery
*Attorney*—Fulwider, Patton, Rieber, Lee & Utecht

[57] ABSTRACT

A dry feed dispenser for fish comprises a container the lower end of which is blocked by a skittle-shaped member from which a pendulum extends downwards into the water. Displacement of the pendulum and hence of the skittle-shaped member by a fish causes a dose of granulated feed to be released from the container and fall into the water.

2 Claims, 3 Drawing Figures

DRY FEED DISPENSERS FOR FISH

BACKGROUND OF THE INVENTION

Dry feed dispensers for fish are required by fish farmers and breeders for feeding doses of granulated feed to newly hatched, young and mature fish, particularly edible fresh water fish, such as trout, carp and the like.

Dispensers are already known in which feed is released from a funnel-shaped container which is supported over a fish pond.

For example, German Utility Model 1964977 contains the teaching that a blocking member in the form of a circular feed plate can be operated by means of a pin connected thereto and pushed against by the fishes, the blocking member being mounted for tipping movement at a vertical spacing from the discharge opening in a funnel-shaped container and releasing the amount of feed in the container over the circular feed plate. The same publication contains a modification of this proposal, according to which the distance between the feed plate and the funnel opening is regulated by means of a vertically displaceable screw below the feed plate.

The disadvantages of these and other prior proposals are the difficulty of regulating the dispenser, and the susceptibility to moisture. These factors tend to result in high feed consumption, which substantially reduces the profitability of fish breeding and farming.

SUMMARY OF THE INVENTION

One object of the present invention is to provide a dispenser in which these disadvantages are substantially reduced.

Another object of the present invention is to provide a dispenser suitable for granular feed of size range 0.5 to 6 mm.

Another object of the present invention is to provide a dispenser which is not seriously adversely affected by moisture.

According to the present invention there is provided a dry feed dispenser for fish, comprising: a feed container which in use is mounted above the water surface of a fish pond, the container having a lower funnel-shaped portion with an aperture at the bottom; a skittle-shaped blocking member which is pivotally suspended so as to extend through said aperture, the skittle-shape including a head portion which is positioned substantially within the funnel-shaped portion of the feed container and a foot portion which extends from the feed container; a feeding pendulum extending from said foot portion of the blocking member so that in use the lower end of the feeding pendulum penetrates the water surface and can be displaced by fish whereby the blocking member is also displaced and feed is released from the feed container to fall into the water; and a protective tube extending from the funnel-shaped portion of the feed container and encircling said foot portion of the blocking member and part of the length of the feeding pendulum.

Preferably said blocking member includes a double-conical portion which abuts the face of said head portion remote from said foot portion and is positioned within said funnel-shaped portion of the feed container, the double-conical portion comprising a first conical portion which extends from said face to an edge whereat the blocking member is of maximum diameter and a second conical portion which extends from said edge t a further face to which is connected suspension means for said pivotal suspension of the blocking member. Said head portion is substantially hemispherical and said foot portion decreases in diameter in the direction away from said head portion to a minimum diameter and then increases to a maximum diameter, charging and discharging chambers being formed respectively in the region between said edge and said head portion, and between said head portion and said minimum diameter portion of said foot portion. The protective tube may taper in the downward direction.

The main components of the dispenser, such as the feed container, lid, struts, blocking member and protective tube are preferably made of transparent or translucent, and preferably impact-proof and/or fiberglass reinforced plastics material, while the parts which must necessarily be made of metal are made in corrosion-proof material or suitable alloys, such as $V_2A$-steel, bronze or the like.

The funnel-shaped portion of the feed container is advantageously injection moulded from a material, such as polythene, polystyrene, PVC or the like.

The blocking member may also be made of other elastomers, such as hard rubber or rubber, of impregnated wood or of light metal, or of a combination of these materials.

BRIEF DESCRIPTION OF THE DRAWINGS

A dispenser in accordance with the present invention will now be described by way of example with reference to the accompanying drawings, in which.

DESCRIPTION OF THE PREFERRED EMBODIMENTS

Figure 1:
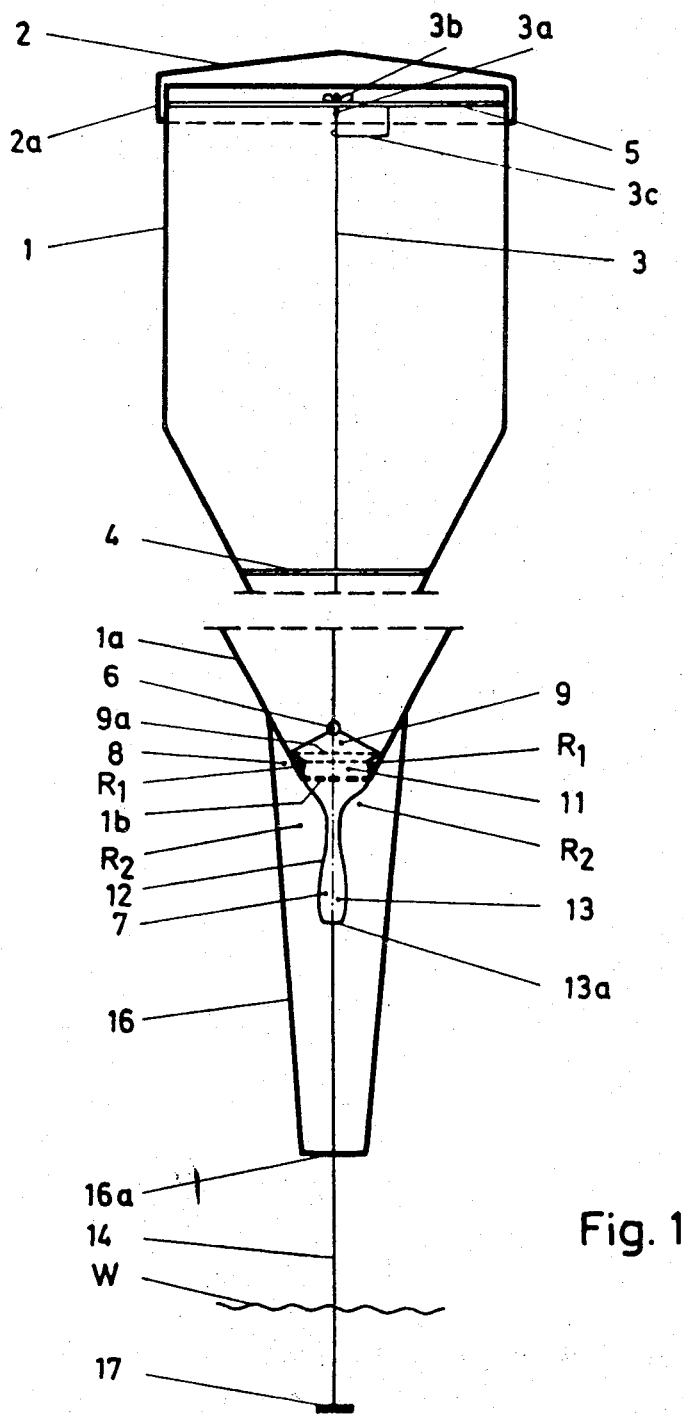
FIG. 1 is a central section through the dispenser.

Referring to FIG. 1, the dispenser comprises a container 1 having a lower, usually integral, funnel-shaped portion 1a the lower end 1b of which is disposed in use over a fish pond of a fishery by means of a suitable support (not shown), so that a discharge opening 16a of a protective tube 16 is about 10 to 15 cm above the water surface W. The container 1 is filled with the desired granulated feed, which may for example have a grain size ranging from 0.5 to 6 mm. The container 1 is preferably made of transparent or translucent plastics material, so that a check can be kept on the amount of fish feed in the container 1. The container 1, which is usually cylindrical, is closed at the top by a tightly fitting lid 2 with a deep depending rim 2a, so that neither rain nor moisture rising from below can enter the interior of the container 1.

A transverse strut 5 is located in the top of the container 1 and a similar transverse strut 4 is located about half-way up the funnel-shaped portion 1a. A screw-threaded upper end portion 3a of a central guide rod 3 extends up through an aperture in the strut 5 and is secured by a wing nut 3b. In order that the guide rod 3 will remain in place when the nut 3b is turned, a retaining wire 3c extends through the portion 3a at right-angles and is secured to the strut 5.

The guide rod 3 also passes through an aperture in the strut 4, a narrow slot extending from this aperture to the edge of the strut 4. Below this the guide rod 3 has a flattened portion, and the lower end of the guide rod is pivotally connected to a skittle-shaped dosing or blocking member 7 from the center bottom of which a feeding pendulum 14 extends downwardly.

Once the wing nut 3b has been removed, the guide rod 3 and retaining wire 3c can easily be removed from the strut 4 by passing the flattened portion through the slot, and can thus be removed from the container 1, together with the member 7 and the pendulum 14. This suspension method also enables the member 7 to be made vertically adjustable, if required.

Figure 2:
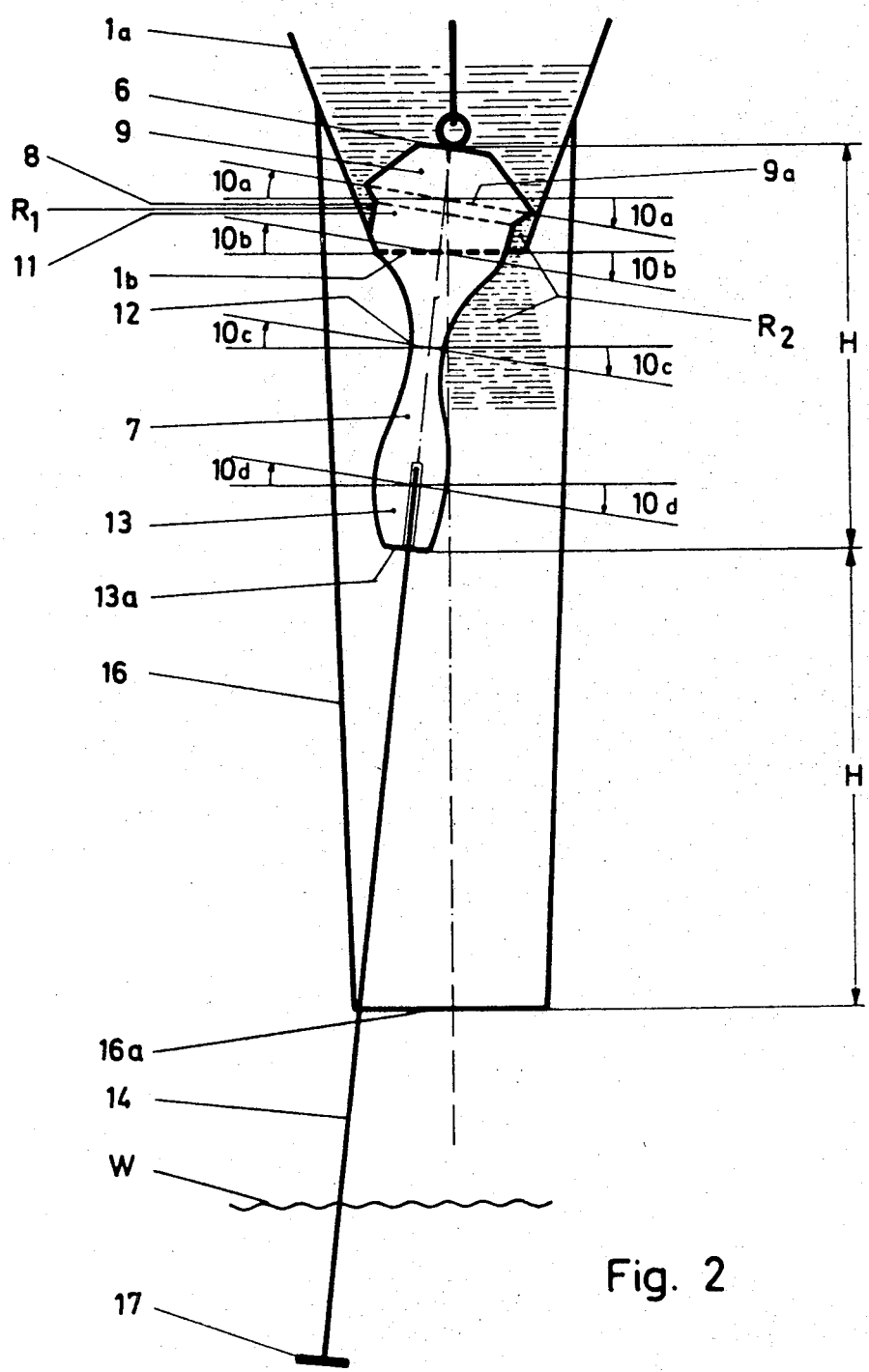
FIGS. 2 and 3 show the dispenser with a blocking member displaced by the maximum extent to the left and right respectively.
Figure 3:
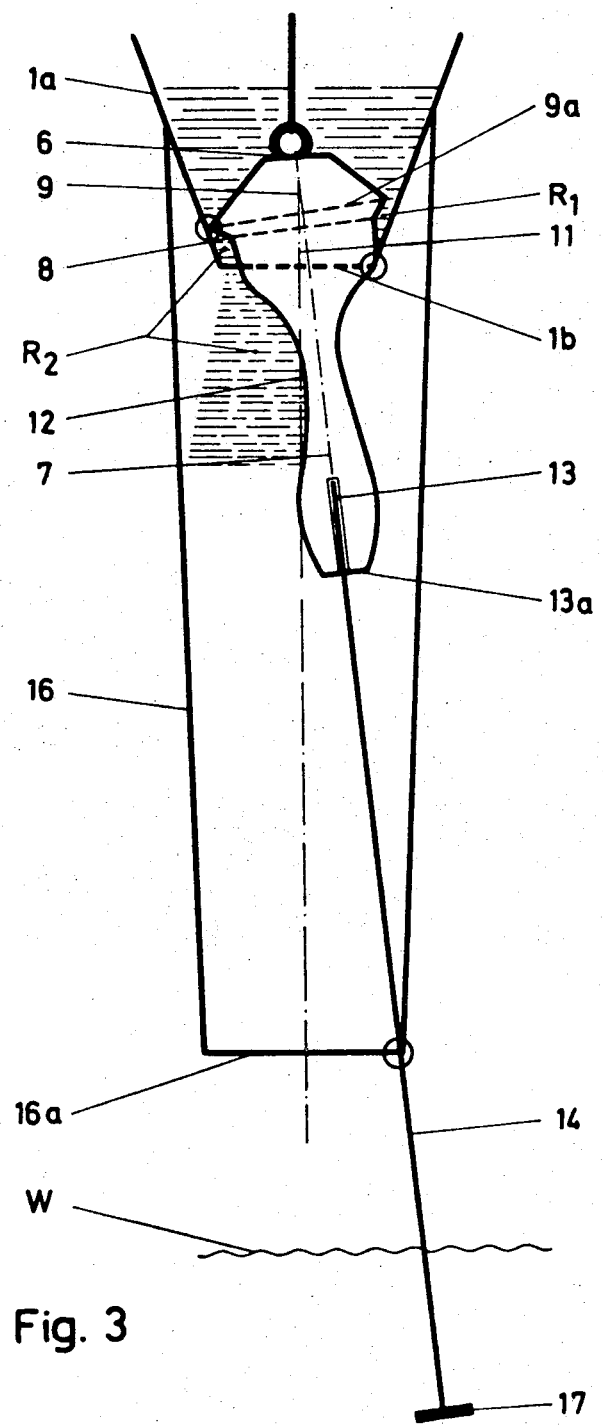

Referring also to FIGS. 2 and 3, the member 7 has a top-center suspension means 6 pivotally connected to the guide rod 3 and comprises a hemispherical skittle-head 11. On the upper side of this is a double-conical portion 9 providing an edge 9a, and on the lower side is a skittle-foot 13 with a lower end 13a. Between the edge 9a and the maximum diameter of the skittle-head 11 is defined a constricted region 8.

At its lower end the skittle-head 11 merges into a lower constricted region 12, the maximum diameter of which lies in the plane 10d. Below this maximum diameter the end 13a is again somewhat constricted.

In the inoperative or closed position, the member 7 is seated in the end 1b of the funnel-shaped portion 1a in such a way that the edge 9a in the plane 10a and the maximum diameter of the skittle-head 11 in the plane 10b form feed charging and discharging chambers $R_1$ and $R_2$ (see FIG. 2), the end 1b lying in the plane 10b. Between the plane 10b and the lower constricted region 12 in the plane 10c, lies the extension of the feed discharge chamber $R_2$, bounded and enclosed by the tube 16, while the maximum diameter of the skittle-foot 13 lies in the plane 10d.

The distance $h_1$ from the lower end 13a of the member 7 to the lower constricted region 12 is approximately the same as the distance from the latter to the suspension means 6. That is, $2h_1 = H$, the height of the member 7. Fixed to the outside of the funnel-shaped portion 1a, substantially at the level of the suspension means 6, is the downwardly tapering tube 16. The distance from the end 13a of the member 7 to the discharge opening 16a is also approximately $H$.

At the bottom end of the feeding pendulum 14 is a small circular cylinder 17 of plastics or similar material, to which is secured dummy feed. The cylinder 17 is approximately equal in diameter to the skittle-head 11 and is mounted interchangeably on the feeding pendulum 14, so that the height of the cylinder 17 can approximately correspond to the mouth size of the type of fish to be fed.

An extreme tilted position of the member 7 to the left is illustrated in section in FIG. 2, from which the action can be seen. On the right-hand side the inflow of feed is cut off because the edge 9a is in tight contact with the inner surface of the funnel-shaped portion 1a (note the displacement of plane 10a); while at the same time the feed which was previously in the chamber $R_1$ is released downwardly. This release has been found to be considerably more effective, in that it has a wider distribution, due to the fact that the member 7 has the additional discharge chamber $R_2$ provided by the lower constricted region 12. In this position of the member 7, the corresponding chamber $R_1$ on the left-hand side is simultaneously filled with feed; the maximum diameter of the skittle-head 11 in the plane 10b seals off the left-hand chamber $R_1$ from below, and, at the same time, allows feed to flow into the left-hand chamber $R_1$.

Thus, the above-mentioned planes 10a to d are displaced by the angle of tilt of the member 7, but remain parallel.

In order that only the minimum amount of moisture can enter the dispenser from below, the member 7 is surrounded by the tube 16; its length $H$ and the discharge opening 16a being dimensioned so that in the positions of maximum tilt, shown in FIGS. 2 and 3, the member 7, with the maximum diameter of the edge 9a in the plane 10a and thus the maximum diameter of the skittle-head 11 in the plane 10b, abuts the end of the funnel-shaped portion 1b and the feeding pendulum 14, which is aligned with the center of the member 7, is simultaneously in contact with the edge of the discharge opening 16a.

In FIG. 3 the two important areas of contact which are present when the member 7 is thus tipped to the right, and which appear punctiform in cross-section are indicated by two circles in the funnel-shaped portion 1a, while another circle indicates the area of contact between the feeding pendulum 17 and the edge of the discharge opening 16a.

It has been found that the tube 16 substantially prevents moisture from entering, and in particular the column of air within the tube 16, tends to prevent penetration of moist air from below.

It has been found that such a dispenser can be used to supply feeds in all grain sizes from 0.5 to 6 mm without difficulty. In particular there is no caking due to moisture and the dispenser supplies the feed in precise doses when the fishes move the feeding pendulum 14, as they soon become accustomed to do.

The size of the member 7 can of course be chosen to suit certain types of feed, or to provide larger or smaller feed charging and discharging chambers. The position of the member 7 can be varied by means of the nut 3b.

The use of such a dispenser can substantially reduce feed wastage, and has proved equally successful for trout, carp, tench and other artificially bred fish and also for newly hatched and young fish of these species.

Various modifications may of course be made without departing from the invention as defined by the appended claims.

I claim:

1. A dry feed dispenser for fish, comprising:
   a feed container which in use is mounted above the water surface of a fish pond, the container having a lower funnel-shaped portion with an aperture at the bottom;
   a skittle-shaped blocking member which is pivotally suspended so as to extend through said aperture, the skittle-shape including a head portion which is positioned substantially within the funnel-shaped portion of the feed container and a foot portion which extends from the feed container;
   a feeding pendulum extending from said foot portion of the blocking member so that in use the lower end of the feeding pendulum penetrates the water surface and can be displaced by fish whereby the blocking member is also displaced and feed is released from the feed container to fall into the water;

a protective tube extending from the funnel-shaped portion of the feed container and encircling said foot portion of the blocking member and part of the length of the feeding pendulum; and with said blocking member further including a double-conical portion which abuts the face of said head portion remote from said foot portion and is positioned within said funnel-shaped portion of the feed container, the double-conical portion comprising a first conical portion which extends from said face to an edge whereat the blocking member is of maximum diameter and a second conical portion which extends from said edge to a further face to which is connected suspension means for said pivotal suspension of the blocking member.

2. A dispenser according to claim 1 wherein said head portion is substantially hemispherical and said foot portion decreases in diameter in the direction away from said head portion to a minimum diameter and then increases to a maximum diameter, charging and discharging chambers being formed respectively in the region between said edge and said head portion, and between said head portion and said minimum diameter portion of said foot portion.

* * * * *